United States Patent [19]

Lawson

[11] 4,102,951

[45] Jul. 25, 1978

[54] CALCINATION OF BASIC FERRIC SULPHATES

[75] Inventor: Frank Lawson, Glen Waverley, Australia

[73] Assignee: Monash University, Clayton, Australia

[21] Appl. No.: 684,004

[22] Filed: May 7, 1976

[30] Foreign Application Priority Data

May 14, 1975 [AU] Australia ............................ 1584/75

[51] Int. Cl.$^2$ ..................... C01G 49/02; H01F 1/10
[52] U.S. Cl. ................. 423/594; 252/62.56; 252/62.63; 423/532; 423/633
[58] Field of Search ............... 423/633, 594, 151, 152, 423/140, 531, 532, DIG. 2, 541; 252/62.63, 62.56

[56] References Cited

U.S. PATENT DOCUMENTS

| 1,269,441 | 6/1918 | Hoffman et al. | 423/DIG. 2 |
| 1,428,633 | 9/1922 | Hoffman | 423/DIG. 2 |
| 2,215,394 | 9/1940 | Hechendleikner et al. | 423/DIG. 2 |
| 2,904,395 | 9/1959 | Downs et al. | 423/594 |
| 2,946,659 | 7/1960 | Francis | 423/531 |
| 2,999,275 | 9/1961 | Blume, Jr. | 262/62.63 |
| 3,347,787 | 10/1967 | Rhodes | 423/DIG. 2 |
| 3,428,416 | 2/1969 | Gle et al. | 423/594 |
| 3,519,386 | 7/1970 | Fedock et al. | 423/594 |
| 3,681,020 | 8/1972 | Shah | 423/541 |

FOREIGN PATENT DOCUMENTS

465,579  12/1971  Japan ................................ 423/633

*Primary Examiner*—O. R. Vertiz
*Assistant Examiner*—W. A. Langel
*Attorney, Agent, or Firm*—Murray and Whisenhunt

[57] ABSTRACT

A two-step process for the calcination of basic ferric sulphates in which the basic ferric sulphate is dehydrated by heating in a relatively low temperature range and the dehydrated product is then decomposed by heating in a relatively high temperature range.

11 Claims, No Drawings

CALCINATION OF BASIC FERRIC SULPHATES

The present invention relates to the calcination of basic ferric sulphates such as jarosite.

When basic ferric sulphates are calcined they decompose to yield $Fe_2O_3$ (Hematite). However, it has been found that if the calcination is carried out by a one-step process an extremely corrosive acidic mist containing sulphuric acid and sulphurous acid is formed.

The present invention provides a process for the calcination of basic ferric sulphates in which the formation of the acidic mist may be avoided.

In one aspect of the present invention there is provided a two-step process for the calcination of basic ferric sulphates in which the basic ferric sulphate is dehydrated by heating in a relatively low temperature range and the dehydrated product is then decomposed by heating in a relatively high temperature range to produce hematite and $SO_3$.

The dehydration stage is preferably carried out in the temperature range from 250° to 600° C, most preferably from 500° to 550° C, for a time sufficient to drive off all of the water contained as hydroxide in the basic ferric sulphate.

The decomposition stage is preferably carried out at temperatures greater than 600° C such as in the temperature range 600° – 1000° C to produce hematite and $SO_3$.

The hematite produced by the process of the present invention has a variety of uses, for example it may be used as a pigment or may be reduced to metallic iron. Further, the hematite produced by the process of the present invention is of uniform particle size and, depending on the mode of preparation of the basic ferric sulphate, can be very pure, even if the latter was precipitated from a solution containing soluble ions such as manganese and vanadium.

Typical basic ferric sulphates useful in the process of the present invention are

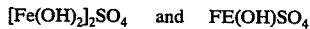

although the use of jarosite is preferred.

Jarosite may be represented by the following general formula:

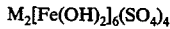

wherein M represents a hydrogen ion, an ammonium ion, an alkali metal ion or any other monovalent cation. Preferably M represents H, $NH_4$, K or Na. It is to be noted that jarosite is subject to stoichiometric variation and some forms thereof may not fall strictly within the general formula given above. However, the present invention is applicable to all forms of jarosite whether or not they fall strictly within the above general formula.

While no "water of crystallisation or association" is shown in the above formulae, the presence or absence of such water makes no difference to the process of the present invention. Such water, if present, is evolved during the dehydration stage of the process of the present invention.

The present invention will, for convenience, be described hereinafter with reference to jarosite but it is to be understood that the invention is applicable to basic ferric sulphates in general.

In the process of the present invention the calcination may be conveniently carried out by gradually increasing the temperature so as to firstly drive off the water content of the jarosite and to produce a dehydrated intermediate product. Usually, the water driven off in the first stage contains some sulphur oxides but not enough to produce a corrosive acidic mist. While we do not wish to be bound by any theory it is believed that the dehydrated intermediate product is a compound of $Fe_2O_3$ and $SO_3$.

After completion of the first stage the gradual increase of temperature is preferably continued and the dehydrated intermediate decomposes in the second stage into hematite and $SO_3$ (and its dissociation products oxygen and sulphur dioxide).

It is preferred for the first and second stages to be conducted separately so as to avoid admixture of the water evolved in the first stage and the $SO_3$ evolved in the second stage which would produce a corrosive acidic mist. In an alternative embodiment the process of the present invention may be carried out by placing the jarosite in a first unit held at a low temperature to form the dehydrated intermediate and then placing the hot dehydrated intermediate in a second unit held at a high temperature so as to cause the decomposition of the dehydrated intermediate.

Thus, the water and $SO_3$ are driven off separately and the formation of a corrosive acidic mist is prevented.

The $SO_3$ produced by the process of the present invention is preferably converted back into sulphuric acid for recycle or other industrial application.

As indicated above the hematite produced by the process of the present invention may be used as a pigment. To produce a red hematite pigment the second stage heating is preferably carried out to a temperature in the range 775°–825° C e.g. 800° C whilst heating to 850° C produces a purple-red hematite pigment.

Where the monovalent cation in the jarosite is the hydrogen ion or the ammonium ion, it is released during the first stage of the calcination process of the present invention. Thus, the hydrogen ion is evolved as water and the ammonium ion is evolved as ammonia during the first stage. Where the monovalent cation is an alkali metal ion the final product contains the alkali metal sulphate which may be released therefrom by leaching with water.

The jarosite starting material used in the present invention may be produced by any of the known methods such as those used for the purification of process streams obtained from the leaching of mineral ores or similar products. Jarosite produced in this fashion often contains occluded impurities. For example, jarosite precipitated during the processing of zinc ferrite contains zinc. If the hematite produced by the process of the present invention is to be used in an application which requires relatively high purity such as pigments it is preferred that the jarosite be derived from bacterial oxidation of ferrous iron in the presence of a monovalent sulphate such as $(NH_4)_2SO_4, K_2SO_4$ or $Na_2SO_4$.

In the bacterial oxidation an acidic solution of ferrous iron, e.g. ferrous sulphate, is bacterially oxidised at a relatively low temperature e.g. 30° –35° C with a suitable bacterium e.g. *Thiobacillus ferrooxidans*, preferably at a pH in the range from 2 to 3 e.g. 2.4. Upon completion of the oxidation the solution is heated e.g. to 80° – 100° C whereupon a readily filterable jarosite is precipitated which contains essentially all of the iron from solution.

The process of the present invention may be modified to produce a soft iron ferrite material useful in the electronics art. In this embodiment of the present invention doping reagents are added to the dehydrated intermediate product obtained from the first stage of the calcination. Suitable doping reagents include materials which can be caused to thermally decompose to metal oxides in the second stage of the calcination such as barium carbonate or strontium carbonate. In this embodiment of the present invention it is preferred that the second stage of the calcination process be carried out in the temperature range 600° – 1400° C, and preferably at least a portion of the second stage is carried out in the range 1000° – 1400° C. Further, it is preferred to use ammonium jarosite as starting material if a doped ferrite is to be produced.

The present invention finds application in the treatment of waste liquors containing ferrous iron, such as sulphuric acid pickle liquors and solutions obtained as a byproduct of titanium dioxide manufactured which are conveniently bacterially oxidised and treated to produce a jarosite precipitate. The jarosite precipitate is separated from the liquids and is then treated in accordance with the present invention to produce hematite and $SO_3$ which may be used as described above.

The present invention will now be illustrated by the following Examples:

EXAMPLE 1

100 grams of potassium jarosite was placed in a furnace at 100° C and the temperature raised to 275° C in 20 minutes. This temperature was held for 60 minutes at the end of which time the sample was removed from the furnace and weighed. The sample was then returned to the furnace and the temperature increased to 550° C over a period of 30 minutes and held for 60 minutes at this temperature. At the end of this time the sample was again removed from the furnace and weighed. The sample was then returned to the furnace and the temperature increased to 850° C over a time interval of 35 minutes and held at this temperature for 60 minutes, removed from the furnace and reweighed. The mass losses from the starting material were 6.0%, 16.0% and 42.1% respectively when the sample was held at temperatures of 275° C, 550° C and 850° C. The heating to 275° C drove off loosely held water molecules such as water of crystallisation or association. The heating from 275° C to 550° C drove off bound water contained in the hydroxide groups of the potassium jarosite, to yield a dehydrated intermediate believed to be a thermally unstable compound of $Fe_2O_3$ and $SO_3$. The heating from 550° C to 850° C decompose the dehydrated intermediate and drove off the $SO_3$ content thereof. Between 275° and 550° C the gases evolved were mainly water but contained small quantities of sulphur oxides.

Between 550° and 850° C the gases evolved contained mainly $SO_3$ together with its decomposition products $SO_2$ and $O_2$.

Although small quantities of sulphur oxides were contained in the water evolved between 275° C and 550° C, the amounts were insufficient to produce a corrosive acidic mist.

The final product contained hematite and potassium sulphate. The potassium sulphate was removed by simple water extraction whereby it was dissolved and the hematite remained behind. The hematite was separated from the water by filtration and was found to be a powder of uniform particle size and high purity which was suitable for use as a pigment.

EXAMPLE 2

The procedure of Example 1 was repeated except that the material in the furnace was held at each of the temperatures 275° C, 550° C and 850° C for a period of 24 hours. Mass losses were determined after each period of 24 hours and the heating was then continued as before.

It was found that the mass losses from the starting material were 6.2% (275° C), 19.0% (550° C) and 42.5% (850° C). The results obtained were similar to those of Example 1 except that the water evolved between 275° and 550° C contained more sulphur oxides and the decomposition of the dehydrated intermediate went further towards completion and the $SO_3$ evolved between 550° and 850° C contained more of the decomposition products of $SO_3$.

The final product was essentially the same as the final product of Example 1.

EXAMPLE 3

The procedure of Example 1 was followed except that the starting material was ammonium jarosite.

The mass losses from the starting material were nil (275° C), 17.4% (550° C) and 51.8% (850° C).

The gases evolved between 275° and 550° C contained primarily water and ammonia with small quantities of sulphur oxides.

The gases evolved between 550°0 and 850° C contained mainly $SO_3$ and its decomposition products $SO_2$ and $O_2$.

As in Example 1, the quantities of sulphur oxides evolved between 275° C and 550° C, were insufficient to produce a corrosive acidic mist.

The final product was a high purity hematite powder of uniform particle size which was suitable for use as a pigment. As ammonia was evolved between 275° and 550° C, no further treatment of the product was required.

EXAMPLE 4

The procedure of Example 3 was repeated except that the material in the furnace was not held at 275° C and was held at each of the temperatures 550° C and 850° C for a period of 4 hours.

Mass losses were determined after each period of four hours and the heating was then continued as before.

It was found that the mass losses from the starting material were 21.5% (550° C) and 54.0% (850° C). The results obtained were similar to those of Example 3 except that the water and ammonia evolved up to 550° C contained more sulphur oxides and the decomposition of the dehydrated intermediate went further towards completion and the $SO_3$ evolved between 550° and 850° C contained more of the decomposition products of $SO_3$.

The final product was essentially the same as the final product of Example 3.

The claim defining the invention are as follows:

1. Process for the calcination of at least one basic ferric sulfate containing the hydroxide radical while avoiding the production of a corrosive acidic mist in the off-gases from said calcination, said process comprising treating the said basic ferric sulfate in at least two stages consisting essentially of driving off all water contained as hydroxide in said basic ferric sulfate in the substantial absence of SO₃ in a given stage by heating said basic ferric sulfate to a relatively low temperature in the range of about 500°0 to 550° C to produce a dehydrated product which is a compound of Fe₂O₃ and SO₃, and thereafter decomposing said dehydrated product in a further stage to form SO₃ in the substantial absence of water vapor to produce Fe₂O₃, by heating said dehydrated product to a higher temperature above 600° C.

2. A modification of the process of claim 1, wherein a doping reagent which can be thermally decomposed to at least one metal oxide is added to said dehydrated product, and the decomposition stage is conducted at a temperature of 600° to 1400° C to produce an iron ferrite material.

3. Modification of claim 2, wherein the second stage temperature is 1000° to 1400° C.

4. Modification of claim 2, wherein said doping reagent is barium carbonate or strontium carbonate.

5. Process according to claim 1 wherein said basic ferric sulfate is jarosite, and said jarosite has the formula:

wherein M is hydrogen, ammonium or an alkali metal.

6. Process according to claim 5, wherein M is hydrogen, ammonium, potassium or sodium.

7. Process according to claim 5 wherein the jarosite is produced by bacterial oxidation of ferrous iron in the presence of monovalent sulfate with subsequent precipitation.

8. Process according to claim 1, wherein said basic ferric sulfate is selected from the group consisting of [Fe(OH)₂]₂SO₄ and Fe(OH)SO₄.

9. Process according to claim 1 wherein the decomposition temperature is from 600 to 1000° C.

10. Process for producing hematite from a jarosite by calcination thereof while avoiding the production of a corrosive acidic mist in the off-gases of said calcination, said process comprising at least two stages consisting essentially of driving off all water contained as hydroxide in said jarosite in the substantial absence of SO₃ in a given stage by heating said jarosite to a relatively low temperature in the range of about 500° to 550° C to produce a dehydrated product which is a compound of Fe₂O₃ and SO₃ and thereafter decomposing said dehydrated product in a subsequent stage to produce said hematite and to form SO₃ in the substantial absence of water vapor by heating said dehydrated product to a higher temperature above 600° C.

11. Process according to claim 10, wherein the dehydrated product is heated to a temperature of up to 1000° C.

* * * * *